(12) United States Patent
Alpern et al.

(10) Patent No.: US 7,945,551 B1
(45) Date of Patent: May 17, 2011

(54) REDIRECTION OF MISSES IN QUERYABLE CACHES

(75) Inventors: David M. Alpern, San Jose, CA (US); Ronald M. Decker, Plymouth, CA (US); James Feenan, Windham, NH (US); Sanjay Hemant Kaluskar, Mountain View, CA (US); Christopher P. Racicot, Mountain View, CA (US); Anindo Roy, Fremont, CA (US); Eric P. Voss, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 1221 days.

(21) Appl. No.: 09/881,501

(22) Filed: Jun. 14, 2001

(51) Int. Cl.
*G06F 17/30* (2006.01)
(52) U.S. Cl. ...................................... 707/706
(58) Field of Classification Search ............ 707/1, 203, 707/4, 201, 2, 9, 10, 104.1, 706; 709/225, 709/217, 236, 226, 224, 219; 711/144; 379/220.01; 700/115; 717/127
See application file for complete search history.

(56) References Cited

U.S. PATENT DOCUMENTS

| | | | | |
|---|---|---|---|---|
| 5,751,581 A | * | 5/1998 | Tau et al. ..................... 700/115 |
| 5,806,074 A | * | 9/1998 | Souder et al. ................. 707/201 |
| 5,832,521 A | * | 11/1998 | Klots et al. ................... 707/203 |
| 5,974,129 A | * | 10/1999 | Bodnar ..................... 379/220.01 |
| 6,009,271 A | * | 12/1999 | Whatley ...................... 717/127 |
| 6,073,168 A | * | 6/2000 | Mighdoll et al. ............. 709/217 |
| 6,243,715 B1 | * | 6/2001 | Bogantz et al. ............... 707/201 |
| 6,285,997 B1 | * | 9/2001 | Carey et al. ...................... 707/4 |
| 6,466,936 B1 | | 10/2002 | Ronstrom |
| 6,487,641 B1 | * | 11/2002 | Cusson et al. ................ 711/144 |
| 2001/0004737 A1 | * | 6/2001 | Laux ................................ 707/1 |
| 2002/0002603 A1 | * | 1/2002 | Vange .......................... 709/219 |
| 2002/0065919 A1 | * | 5/2002 | Taylor et al. ................. 709/226 |
| 2002/0091853 A1 | * | 7/2002 | Moore et al. ................. 709/236 |
| 2002/0124082 A1 | * | 9/2002 | San Andres et al. .......... 709/225 |

OTHER PUBLICATIONS

Microsoft Computer Dictionary, Fifth Edition, Copyright 2002 by Microsoft Corporation.*
Microsoft Computer Dictionary, Fifth Edition.*
Dar, Shaul, Franklin, Michael j., Jonsson, Bjorn, Srivastava, Divesh, Tan, Michael; "Semantic Data Caching and Replacement" Proceedins of the 22nd VLDB Conference, India, 1996.

* cited by examiner

Primary Examiner — Etienne P LeRoux
(74) Attorney, Agent, or Firm — Vista IP Law Group, LLP (57) ABSTRACT

A cache with a database system that contains a subset of the objects stored in another database system. The cache database system responds to a request that contains a reference to an object that is not in the cache by redirecting the request to the other database system when the request is executed in the cache's database system. Redirection is done by rewriting requests that refer to objects that are not in the cache. In one kind of rewriting, a cursor is marked to indicate redirection, and when the cursor is executed in the cache database system, it is redirected to the other database system for execution. In the other kind, calls to stored procedures that are not present in the cache database system are rewritten as remote procedure calls to the stored procedures in the other database system.

20 Claims, 5 Drawing Sheets

REDIRECTION OF MISSES IN QUERYABLE CACHES

CROSS REFERENCES TO RELATED APPLICATIONS

The present patent application is being filed on even date with three other patent applications addressed to techniques for improving queryable caches. The present patent application is also related to U.S. Ser. No. 09/294,656, Cusson, et al., Web servers with queryable dynamic caches, filed Apr. 19, 1999 and to its PCT counterpart, PCT/US00/10516, which was published Oct. 26, 2000 as WO 00/63800. All of the related applications have a common assignee.

BACKGROUND OF THE INVENTION

1. Field of the Invention

The invention relates generally to techniques for making frequently-referenced data more available to programs using the data and more specifically to techniques for making distributed queryable caches of data that is contained in large databases. The caches are transparent to the program that is querying the large data base in that the program generally need not be altered when a cache is added.

2. Description of Related Art

Local and Remote Copies of Data

A common problem in data processing systems is that frequently-used data cannot be quickly accessed, either because there is not enough capacity in the connection between the processor and the data storage or because too many program executions are contending for access to the data storage. One way of solving the problem is to make a copy of the data and put the copy in a location where it is more accessible to some of the program executions that are using the data. Those program executions can then reference the copy of the data in the more accessible location rather than the original data. In the following, the more accessible copy will be called the local copy, while the less-accessible original will be called the remote copy. It is to be understood, of course, that the terms remote and local represent degrees of accessibility and that both copies may be physically in the same location.

The local copy may be a complete copy of the data or it may be only a partial copy; further, the local copy may or may not be transparent to the executing program. When the local copy is transparent, the executing program can refer to a data item in exactly the same fashion as it did before the local copy existed. The reference goes first to the local copy. If the data is there (this is termed a hit), the data is retrieved from the local copy. If the data is not there (this is termed a miss), the reference goes automatically to the remote copy and the data is retrieved from the remote copy. When the local copy is not transparent, the program must be changed to take into account the fact that references are made to the local copy, instead of to the remote copy. In general, local copies of remote data that are both partial and transparent to the executing program are termed caches. Transparence is a relative term. Though the executing program need in general not be modified when the cache is added, the presence of the cache may result in some differences in the program's behavior, and in some cases the differences in behavior may require modification of the program.

Whenever there are local and remote copies of data, the copies must be kept consistent with each other. This is easy only if the data never changes; if it does change, then changes in one of the copies must be propagated to others of the copies. In some cases, the local copy is read only; the programs using it cannot change it, but changes in the remote copy are propagated to the local copy. In other cases, the local copy is updateable, and when this is the case, the updates must be propagated to the remote copy. When the propagation is done depends on how consistent the copies must be. For example, if the copies can be inconsistent for a whole working day, changes need only be propagated once a day. On the other hand, if it is required that the copies are always consistent, any change must be propagated immediately.

Local and Remote Copies of Databases

Databases are organized collections of data in which sets of data items are accessed by queries. The query describes the set of data items to be accessed in terms of the database's organization. The most common kind of organization for databases is relational: the data is organized into tables with named columns and rows. Each row has a field for each of its columns. A field for a column in a row contains that row's value for the column. Values in the fields can serve to uniquely identify rows of the database and to relate rows in one table to rows in a different table. A set of data items contained in a relational database is specified in terms of rows and columns of the table the items are in and values in the row or rows that contain the items. The following Employees table offers a simple example:

| emp_id | emp_name | emp_pay |
|--------|----------|---------|
| 000001 | "Owner"  | $1,000,000 |
| ...    | ...      | ...     |
| 000999 | "Drudge" | $20,000 |

This table has three columns and a row for each employee. the emp_id field of an employee's row contains a unique identifier for the employee; the emp_name field contains the employee's name; the emp_pay field contains the employee's current pay.

Relational database systems use a language called SQL to specify data sets. An SQL request on a database describes an operation to be performed on a set of data in the database. The most common kind of request is a query, which describes an operation that reads the set of data. Other requests may modify the set of data or delete the set of data. For example, an SQL query to find out how much employee "Owner" makes might look like this:

SELECT emp_pay FROM Employees
WHERE emp_name="Owner"

This instructs the data base system to return the value of emp_pay from the row of the table Employees in which the field Emp_name has the value "Owner". The result of the query will be "$1,000,000". A database system contains not only the data, but also a description of the manner in which the data is organized. In the following, the description will be termed a data dictionary. Elsewhere, it may be termed the data base system's metadata or its schema.

Many organizations keep huge amounts of information in large central databases. As networks have grown, so has the potential for these large databases to be bottlenecks. The bigger the network, the more users, and the greater the problems caused by contention for the data base. Moreover, the network's carrying capacity is always less than the demands being made on it. As a result, it often takes a long time to transmit the query to the database, have the database perform the query, and have the results returned to the user. The development of the World Wide Web has of course increased all of these problems enormously. The database that contains the catalog of a Web merchant is accessible to literally everyone who has a connection to the Internet, and delays in getting a response are not only unpleasant for the user, but bad for the Web merchant's business.

A common approach to solving bottlenecks caused by databases is by replicating the data base. As the name implies, a replicated data base has a copy at another location. When a set of replicated databases is set up, methods are specified for keeping the replications consistent. A replicated database may be a complete copy of the database it is a replication of, or a partial copy. In the latter case, the partial copy is termed a materialized view. A materialized view may be read only, in which case, it is kept consistent with the database it is a copy of, but cannot be updated by the user, or it may be updateable, in which case the data items in the materialized view may be updated and the updates are propagated to the database of which the materialized view is a copy. A replicated database system provided by Oracle Corporation, of Redwood Shores, Calif., USA, is described in detail in the document *Oracle 8i Replication*, available in May, 2001 at http://technet.oracle.com/doc/server.81.5/

A problem with materialized views is that they are not transparent to the application program. If the application program provides a query to the materialized view that specifies a set of data items that is not in the materialized view but is in the database the materialized view was replicated from, the query simply fails, and the application must attempt it again on the database the materialized view was replicated from. Materialized views are consequently typically used in situations where it is possible to completely predict what queries will be made from a given remote location. The database tables needed to answer those queries are included in the materialized view, and since a miss never occurs, the fact that the materialized view provides no support to an application that has experienced a miss is not a problem.

However, as networks expand and more and more people need access to databases to do their jobs or to purchase products, selecting the right materialized view becomes more and more difficult. Oracle Corporation has responded to this problem by developing the queryable database cache described in published PCT application WO 00/63800, Oracle Corporation, Web Servers with queryable dynamic caches, published 26 Oct. 2000 and claiming priority from U.S. Ser. No. 09/294, 656, Cusson, et al., Web servers with queryable dynamic caches, filed Apr. 19, 1999. The cache of WO 00/63800 is transparent. When an application program makes a query on the cache, the query goes to a data access layer, which provides the query to the cache. If the query misses, the data access layer redirects the query to a remote database. There is thus no need for the application to know anything about either the cache or the remote database.

Though the queryable cache described in WO 00/63800 does have the fundamental advantage of transparency to the application program, experience with the cache has revealed some areas where improvement is needed:

The queryable cache needs to be transparent not only to the application program, but also to the data access layer.

The queryable cache needs to handle SQL requests that reference stored procedures.

There needs to be an easy way of setting up the cache so that it has all of the copies of objects that it needs to function and also has the objects necessary to link the cache to the remote database system that it is a partial copy of.

There needs to be a way of making a user session to perform redirected operations in the remote database without requiring a password from the user to make the session.

The two-stage commit process used for transactions between distributed databases needs to be optimized for the situation where the transaction does not result in modifications to particular ones of the distributed databases.

It is an object of the invention disclosed herein to solve one or more of the foregoing problems. As will be described in more detail in the following, the problems have been solved in an implementation of the queryable cache which is based on Oracle's techniques for making replicated databases that contain materialized views.

SUMMARY OF THE INVENTION

The redirection techniques of the invention attain transparency even with regard to the data access layer and also work where what is missing in the cache database system is a stored procedure. At a fundamental level, the techniques determine that an object needed for execution of a request in the cache database system is lacking in the cache database and then, during execution of the request in the cache database, redirect the execution to another database system at least with regard to the lacking object.

One way of accomplishing the above is to determine when the request is being put into a form required for execution in the cache database system whether the execution requires the lacking object, and if it does, modifying the form so that the modified form causes the execution to be redirected to the other database system. Where the request includes an SQL statement, a cursor is produced from the SQL statement and the cursor is marked to indicate that the cursor's execution is to be redirected to the other database system. When the request includes a call to a procedure object that is lacking, the call is rewritten in the form required for execution as a remote procedure call directed to the other database system.

Other objects and advantages will be apparent to those skilled in the arts to which the invention pertains upon perusal of the following Detailed Description and drawing, wherein:

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first describe database replication as it is implemented in the Oracle 8i® database system to the extent necessary to understand the invention and will then describe the invention itself.

Figure 1:
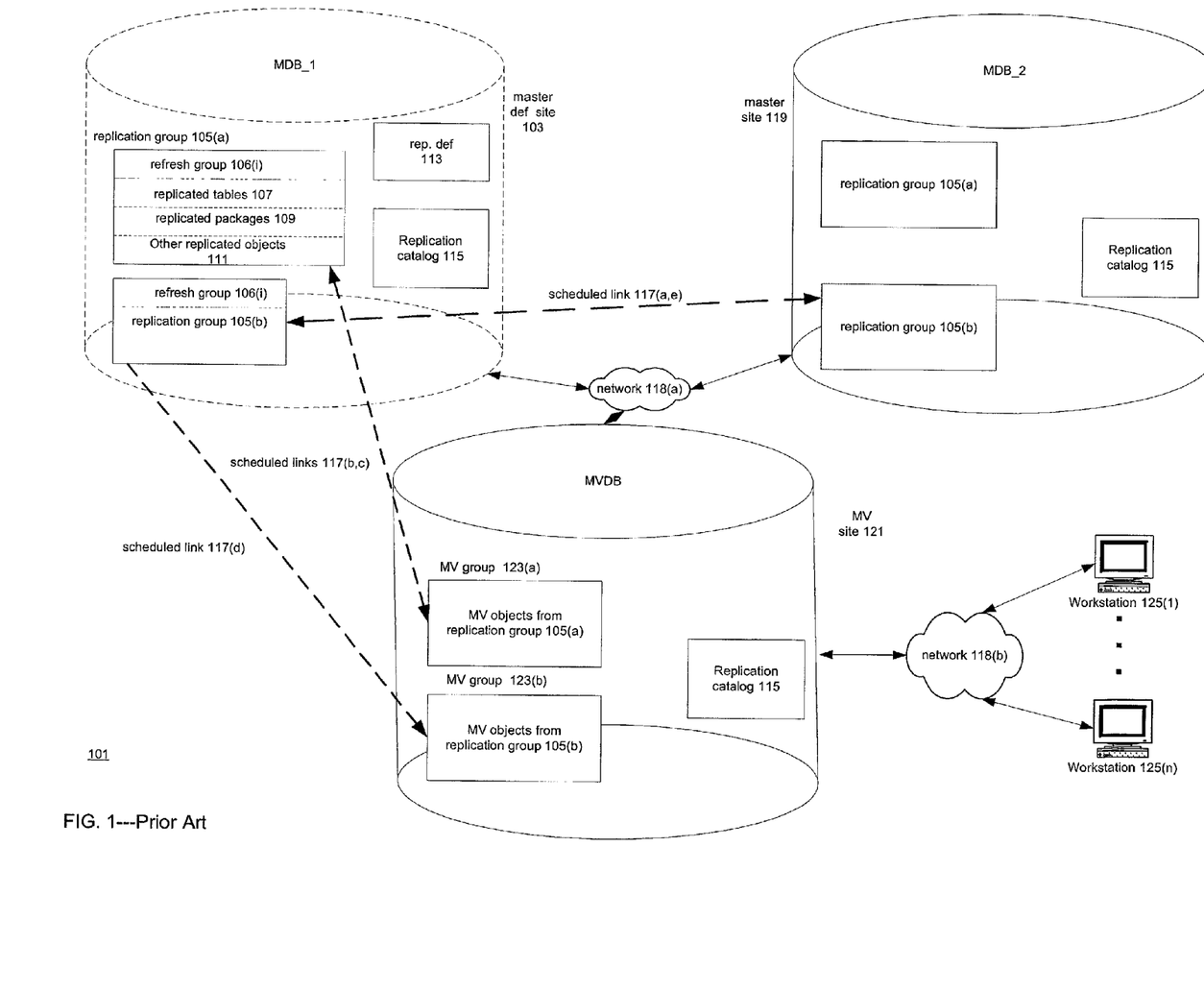
FIG. 1 is a block diagram of a prior-art distributed database system with replication.

Overview of Distributed Data Bases and Replication: FIG. 1

Distributed Databases

A distributed database is a set of databases that appear to an application program as a single database. Database objects are stored in the databases. Among database objects are database tables, packages of procedures that operate on the tables, trigger procedures that are executed in response to changes in the tables, and indexes for the tables. In the Oracle 8i database system, objects are organized into schemas associated with users of the database. The user with which a schema is associated is termed the owner of the database objects in the schema. An SQL request may reference any of the database objects in the database. When a request references a stored procedure, the database system invokes the stored procedure. FIG. 1 shows a prior-art distributed database 101. Three databases, 103, 119, and 121, contain information which is used by applications running on a workstation 125(i). The databases exchange information among themselves via network 118(a); workstation 125(i), along with a number of other workstations, has access to database 121 via network 118(b). In a typical configuration, network 118(a) may be an intranet belonging to the organization to which the three databases belong. Database 121 may be located at a server that responds to the World Wide Web protocols, network 118(b) may be the Internet, and workstation 125(i) may be executing a Web browser program. In such a configuration, the user of workstation 125(i) provides the server with information that the server uses to make an SQL request to be executed in database 121. The server then incorporates the results of the request in a Web page which it returns to workstation 125(i).

When references are made to objects in distributed database 101, the reference must specify not only the object within a database, but also the database itself. Thus, a reference to an object contained in database 103 must employ the name of that database, MDB_1, as part of the reference. References that include the name of the database that contains the object are called global references. The totality of possible global references make up the global name space of the distributed database 101.

A database that belongs to a distributed database may refer to an object in another of the databases in the distributed database by means of a link. A link is a pointer in one database to an object in another. The pointer includes the global name of the object in the other database. A reference made via a link further contains sufficient information about the source of the reference so that the database that includes the object can determine whether to grant access to the object. There are two kinds of links:

A redirection link replaces an object in one database of a distributed database system with a reference to another database of the system that contains the object. The database with the link uses the link to redirect the reference to the other database.

A scheduled link is used to keep copies of objects in different ones of the databases consistent with one another. Scheduled links will be explained in detail below.

Replication

Replication is the process of copying and maintaining database objects in multiple databases that make up a distributed database system. The objects that are copied and maintained are termed replicated objects. When a replicated object is modified in one of the databases, the modification is captured and stored locally before being forwarded and applied at each of the other databases. Systems 103, 119, and 121 contain replicated objects and are termed replication sites. There are two basic kinds of replication: multimaster replication and materialized view replication. Replication may further be done synchronously, i.e., modifications are propagated to the other replication sites substantially when they are made, or asynchronously, i.e., the modifications are propagated at some later time.

Multimaster replication is done in database systems that are master replication sites. There are two such sites in FIG. 1, site 103 and site 119. Each of these master replication sites contains copies of all of the database objects in two replication groups 105(a) and 105(b). The objects in the replicated groups are the replicated objects in the database. In each database system, replication catalog 115 specifies the replicated objects and the groups they belong to. Included in replication catalog 115 are scheduled links 117 between the replicated objects in the replication groups. Double-ended arrows indicate a link in each direction. The scheduled links define how updates are propagated between the replicated objects so that the objects belonging to the replication groups in the master replication sites remain consistent. When the link specifies a synchronous update, the update is propagated as soon as it is made; when the link specifies an asynchronous update, the updates are propagated in batches. Database system 103 is further a master definition site, which serves as a control point for replication in all three of the database systems of system 101. Replication definition 113 contains the information which master definition site 103 needs to control replication in system 101.

Materialized view site 121 differs from master sites 103 and 119 in that it contains materialized view groups instead of replication groups. A materialized view group may contain fewer than all of the objects in a replication group 105. In addition, a table in a materialized view group may contain less than all of the data in the corresponding object in the master site or may include material from several tables in the master site. Such tables are generally termed views. In many cases, there is no actual table in the database system corresponding to a view; when a query specifies a view, the data specified by the query on the view is simply retrieved from the tables upon which the view is defined. A table that actually exists in the database system is termed a base table. There are situations in which an independent table corresponding to a view is produced and included in the database. Such tables are termed materialized views. Materialized view site 121 is so called because its database stands in the same relationship to the database in its master site 103 as a view stands to its base tables and because tables corresponding to the views on base tables in master site 103 that are included in site 121 really exist in site 121.

Thus, materialized view group 123(a) contains objects from replication group 105(a), while materialized view group 123(b) contains objects from replication group 105(b). An object that belongs to a materialized view group is termed herein a materialized view object.

Materialized view objects may be read-only or they may be updateable. In the former case, changes made in an object in a master site that corresponds to an object in a materialized view group are propagated to the materialized view group, but no changes can be made in an object in the materialized view group by an SQL request directed to the materialized view group.

When a materialized view object is updateable, changes made in the materialized view object are propagated to the corresponding object in the replication group corresponding to the materialized view group, and if there are other master sites, to the corresponding objects in the replication groups in those sites. Propagation of changes made in the materialized view object is as described generally for master sites. Propagation of changes from the master site to the materialized view are always done in batch mode. A given propagation of changes from the master site to the materialized view is termed a refresh of the materialized view. Refresh groups 106 for the materialized view may be specified in replication catalog 115. A refresh group may include objects from more than one replication group, as shown by refresh group 106(*i*) in master site 103. Refreshing is done by materialized view. There are two kinds of refresh:

a complete refresh refreshes all of the data in a materialized view at once.

a fast refresh merely refreshes all of the data in the materialized view which has changed since the last refresh.

The Oracle 8i system can be set to automatically perform a complete refresh when a fast refresh fails. Such a complete refresh is called a force refresh.

A major problem for the database administrator who is in charge of a distributed data base system that includes a materialized view is making sure that the materialized view database contains copies of all of the database objects that are referred to by the application programs using the materialized view. For example, if the application program calls a stored procedure and the stored procedure is not in the materialized view database, the call will fail. In order to properly design a materialized view database, the database administrator must not only understand the relationships between the tables that are being replicated in the materialized view, but also understand how these tables are queried by the application programs and what other objects the application program requires. Once the database administrator has obtained a correct design, the administrator can make a template that specifies the database objects that are required for the materialized view database and the materialized view database can use the template to copy the required objects from its master database.

A system like system 101 may of course have any number of master sites and a master site may have any number of replication groups. There may also be any number of materialized view sites 121, but each materialized view site 121 must obtain its materialized view objects from a particular one of the master sites. Other embodiments may permit materialized view sites 101 to have materialized view objects from replication groups in more than one master site.

Figure 2:
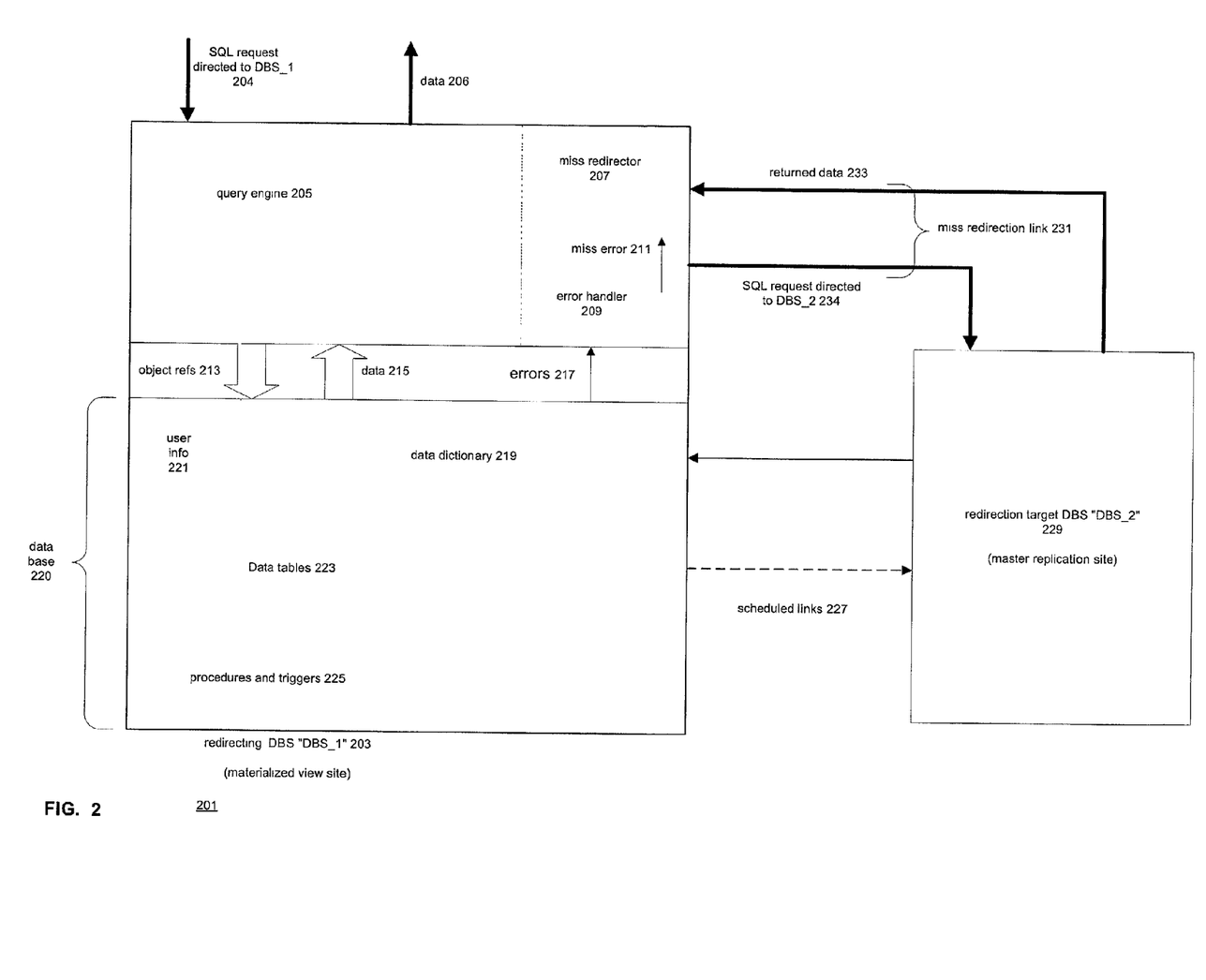
FIG. 2 is a block diagram of a distributed database system with replication in which a first database in the system that does not have a database object referred to in a request to which the first database responds redirects the request to a second database in the system.

Modifying a Distributed Database System with a Materialized View Site so that the Materialized View Site can Function as a Queryable Cache: FIG. 2

A materialized view site is like a queryable cache in that it responds to SQL requests and moves a subset of the database objects contained in a master site closer to the consumer of the data. It is unlike a queryable cache in that it is not transparent; when a data object is missing in the materialized view site but present in the master site, a SQL request that refers to the data object simply fails, rather than being automatically redirected to the master site. FIG. 2 shows how a distributed database system with a materialized view site can be modified to make the materialized view site function as a queryable cache.

Database system 201 in FIG. 2 includes a redirecting database system 203 which is a modified materialized view site and a redirection target database system 229 which is a master site for redirecting database system 203. Redirecting database system 203 has the global name DBS_1 and redirection target database system 229 has the global name DBS_2. At the highest level, database system 201 operates as follows:

1. Database system 203 receives an SQL request 204;
2. Database system 203 attempts to execute the SQL request; as part of executing the SQL request, database system 203 parses the request. As part of parsing the request, database system 203 determines whether the request can be executed in database system 203 or must be redirected to database system 229. In the former case, database system 203 executes the request and returns the data 206 resulting from the execution to the source of the SQL request;
3. If the request must be redirected, a miss has occurred and database system 203 redirects part or all of the SQL request to database system 229, as shown by arrow 231;
4. Database system 229 executes the redirected portion of the SQL request and returns the results to database system 203 (arrow 233), which integrates it with any part of the results obtained in database system 203 and returns the complete results 206 to the source of SQL request 204.

There are many reasons why a miss may occur. Perhaps the most common is that an object referred to in the request is not present in database system 203; another is that the request updates an object and the object is read only in database system 203 but updateable in database system 229; a third is that the request uses information about an object that may be different in database system 203 and in database system 229; a fourth is that the user making the request has privileges in database system 203 that prohibit the request and privileges in database system 229 that allow it.

Database system 201 differs from the system disclosed in WO 00/63800, Cusson, et al., Web servers with queryable dynamic caches, in that the redirection is done within database system 203, not in the data access layer. It should further be pointed out here that the techniques of database system 201 only require that all of the references in the request received in database system 203 be resolvable in one or another of a set of database systems that either themselves redirect SQL requests or are reachable by redirection from database systems that do, with all of the databases in the set being reachable either directly or indirectly by a redirection that begins from database system 203.

Continuing in more detail with database system 203, like all database systems, database system 203 includes a query engine 205 and a database 220. Query engine 205 resolves the references in SQL requests and performs the operations specified for the references on the objects specified by the references, as indicated by arrow 213. The results of the operations are returned to query engine 205, as shown by arrow 215. Database 220 has two main components: tables 223 and procedures and triggers 225. The procedures and triggers are stored programs that are executable by query engine 205. A procedure is executed when an SQL request includes a reference to the procedure; triggers are associated with other database objects and are executed when a condition under which the trigger is to be executed arises with regard to an object with which the trigger is associated. The tables include data dictionary 219, user information 221, and user tables 223. As its name implies, data dictionary 219 is a set of tables that describes all of the objects in the database system. User information 221 is tables that contain information about users of the system.

As with a standard materialized view site, database system 203 is connected by scheduled links 227 to redirection target database system 229. If database system 203 contains only read-only objects, then the only scheduled link needed is one (solid line) that provides for any necessary propagation of changes in database system 229's objects that have copies in database system 203 to database system 203. If database system 203 contains updateable objects, then there is a scheduled link (dashed line) that provides for propagation of the updates of these objects to database system 229.

Database system 203 has been modified from a standard materialized view site to enable redirection as follows:

a miss redirection link 231 has been established between database system 203 and database system 209;

code for a miss redirector 207 has been added to query engine 205.

Continuing in more detail with miss redirection link 231, miss redirection link 231 is a generalized mechanism for transferring an SQL request or a portion thereof from one database system to another. It therefore does not connect a representation of an object in one database to the object itself in another, but rather one database to another. Because it is a generalized mechanism, it can be used to transfer an SQL request when there is a miss. The redirection links used in distributed database system 101, by contrast, simply permit a reference in an SQL request to be resolved not to the data itself, but rather to a specification of another database where the data may be found. Because this is the case, a miss will not occur where there is a standard redirection link and consequently, standard redirection links cannot be used to deal with misses.

With regard to miss redirector 207, an error handler 209 is a standard component of database systems. When an error occurs while the database system is dealing with an SQL request, for example, the request contains a reference to an object that is not in the database system, the database system produces an error message that identifies the error. Error handler 209 handles the error, generally by examining the error message and invoking a function that deals with the error. In database system 203, the function that handles errors resulting from misses is miss redirector 207, which takes either the entire SQL request or the portion of the request that caused the miss and redirects it via miss redirection link 231 to redirection target database 229, as shown at 234. When the result of the redirected request or portion is returned via link 231, as shown at 233, miss redirector 207 provides the result to query engine 205 for inclusion with whatever results were obtained locally. In a preferred embodiment, the database system employs an exception handling mechanism: an exception handler is defined for a particular set of errors and when an error occurs, the query engine raises an exception that specifies the error and invokes the exception handler; in the preferred embodiment, if the error is a miss, the exception handler then invokes miss redirector 207.

Details of Redirection in a Preferred Embodiment

The basic principle of redirection in DBS 203 is simple: the set of database objects in DBS 203 is a subset of the set of database objects in DBS 229. Since that is so, when an SQL request 204 received in DBS 203 specifies an operation on a database object that is not available in DBS 203, DBS 203 redirects the operation to DBS 229 via miss redirection link 231. In the preferred embodiment, SQL request 204 contains two different kinds of elements: SQL statements, which specify operations defined by the SQL language on the database's tables, and PL/SQL statements, which are statements of a programming language that is used for procedures and triggers 225. In other embodiments, SQL request 204 may contain statements in other programming languages. A PL/SQL statement may include an invocation of a stored procedure 225; when the invocation is executed, the result is a call to the stored procedure. The called procedure is executed and the results returned to the execution of the PL/SQL statement that contained the invocation. The stored procedure need not be a PL/SQL procedure; the only requirement is that it be callable from a PL/SQL statement.

Figure 3:
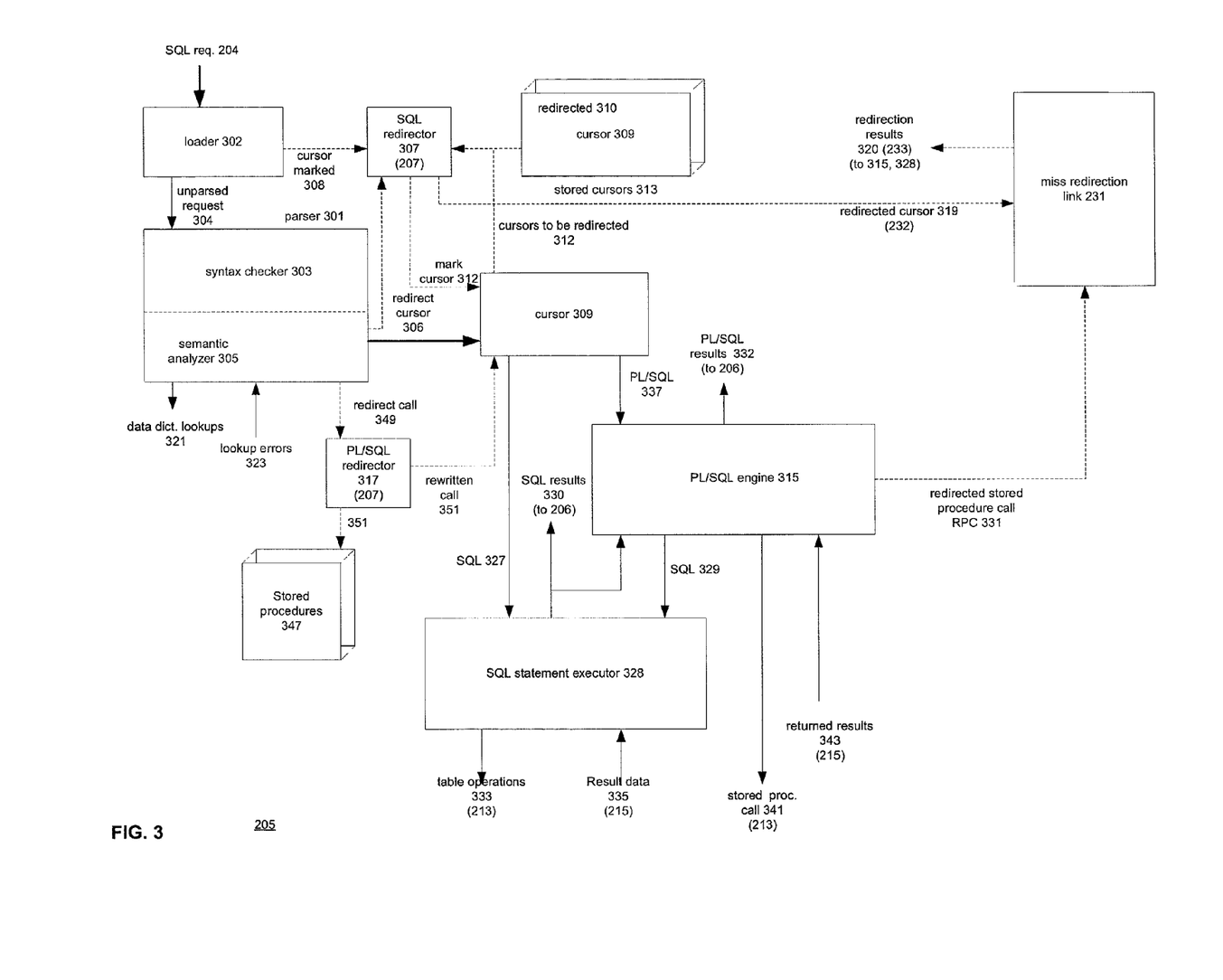
FIG. 3 is a detailed block diagram of query engine 205.

Redirection Generally: FIG. 3

In the preferred embodiment, both SQL operations and PL/SQL calls may be redirected as described above and both are redirected via miss redirection link 231, but separate redirection mechanisms are used for SQL operations and PL/SQL calls. FIG. 3 presents a detailed view of those components of a preferred embodiment of query engine 205 which are relevant to the present discussion. Where a component of FIG. 3 corresponds to a component of FIG. 2, the reference number of the FIG. 2 component appears in parentheses; further, information flows in redirection are shown by dashed arrows.

When an SQL request is received in DBS 203, it is in the form of a sequence of character codes. The characters represent SQL and PL/SQL statements. The SQL request goes first to loader 302, which determines whether there is already a cursor for the SQL request. The cursor is an area of memory which is private to the request. The area of memory contains a version of the SQL request which is easy for query engine 205 to execute along with information needed to process the request. In order to save time in executing identical SQL requests, query engine 205 stores previously made cursors 313 so that they can be located by SQL request; if there is a previously-made cursor for a newly-received SQL request, loader 302 simply locates the previously-made cursor and uses the previously-made cursor.

If there is no stored cursor 313 for the SQL request, loader 302 provides the request to parser 301, which makes the request into a cursor 309. Parser 301 has two main components: syntax checker 303, which checks the SQL and PL/SQL statements to make sure they are in the form required by the language, and semantic analyzer 305, which looks up references to database objects in the statements in data dictionary 219 (321).

In the case where no redirection is required, when cursor 309 for the SQL request has been located in stored cursors 313 or produced from the request by parser 301, cursor 309 is executed. The SQL components 327 of cursor 309 are executed by SQL statement executor 328; the PL/SQL components 337 are executed by PL/SQL engine 315. A PL/SQL component may include an SQL component, and when that is the case, PL/SQL engine 315 provides the SQL component 329 to SQL statement executor 328. SQL statement executor 328 emits table operations 333 to the tables in database 203 and receives result data 335 produced by the operations. The results 330 are then provided to the source of the SQL request, or if the SQL component came from PL/SQL engine 315, the results go to engine 315.

Redirection of cursor 309 is required if SQL request 204 contains a reference to an object that is not in database 203. This situation is detected by semantic analyzer 305. Semantic analyzer 305 does a lookup 321 in data dictionary 219 for each reference in request 204. If an error 323 occurs, indicating that the reference is not in data dictionary 219 and the object is therefore not in database 203, semantic analyzer finishes the cursor and indicates to SQL redirector 307 that the cursor is to be redirected. SQL redirector 307 redirects the cursor via miss redirection link 231 (319) and marks the cursor as redirected. Similarly, if a stored cursor 313 is marked as redirected, loader 302 indicates to SQL redirector 307 that the cursor is to be redirected and SQL redirector 307 again redirects the cursor to miss redirection link 231. Results of the redirection are returned vial link 231.

Included in the PL/SQL components executed by PL/SQL engine 315 are calls to stored procedures 225. If the stored procedure specified in the call is present in DBS 203, PL/SQL engine 315 fetches the stored procedure and executes it (341), with the results (343) of the execution being returned to the point in the PL/SQL component where the call to the stored procedure was executed. If the stored procedure specified in the call is not present in DBS 203, that fact is detected by semantic analyzer 305, which indicates to PL/SQL redirector 317 that the call needs to be redirected. Redirector 317 then rewrites the call as a remote procedure call to database system 229 (351). The rewrite specifies that the call is to be made via link 231. Remote procedure calls are a well-known technique by means of which an application running in one thread, process, or system can call a procedure that will execute in another thread, process, or system and receive the results of the execution. When the remote procedure call is executed, the procedure is executed on miss redirection target DBS 229.

In the Oracle 8i database system, a client system upon which an application program that is the source of an SQL request 204 is executing may include a PL/SQL engine, and the SQL request may include a remote procedure call to a stored procedure in the DBS to which the request 204 is directed. If the stored procedure specified in the remote procedure call is not in redirecting DBS 203, Parser 301 causes redirector 317 to rewrite the remote procedure call as described above, and PL/SQL engine 315 then executes rewritten remote procedure call 351.

Figure 4:
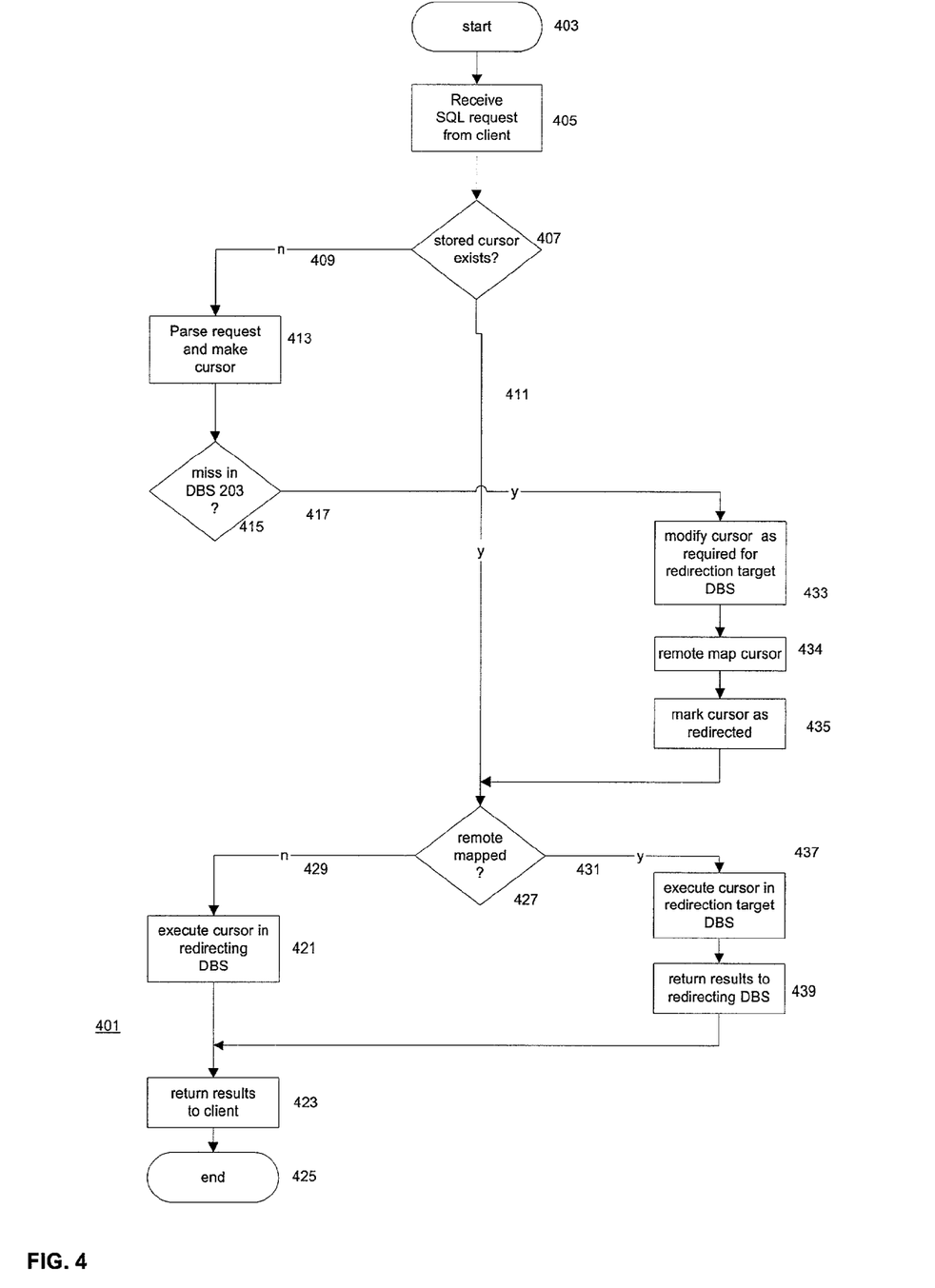
FIG. 4 is a detailed flowchart of cursor redirection.

Redirection of Cursors: FIG. 4

Flowchart 401 in FIG. 4 shows details of cursor redirection. The flowchart reflects the fact that there are three stages of execution of an SQL request: parse, fetch, and execute. Cursor redirection is set up in the parse stage and the cursor is redirected in the execute or fetch stages. In the parse stage, the SQL request is received in query engine 205 from the client (405); at 407, loader 302 determines whether a stored cursor exists; if not, branch 409 is taken; otherwise, branch 411 is taken. In branch 409, parser 301 parses the request and makes the cursor (413). If an error arises that indicates that an object referred to in the request is not present in database 203 (415), or that the object cannot be operated on in database 203, a miss has occurred (415) and branch 417 is taken: the cursor is modified as required for execution on redirection target DBS 229, is then remote mapped (434), i.e., set up to execute on redirection target database 229, and then marked as redirected to distinguish it from other remote mapped cursors (435). In the fetch or execute stages, cursors are checked to see whether they are remote mapped (427). If they are, they are redirected. In the case of remote mapped cursors resulting from misses, the cursor indicates that it is to be redirected to target DBS 229 and the cursor is executed there (437) and the results returned to redirecting DBS 203. If the cursor is not remote mapped, it is simply executed in the redirecting DBS (421). In both cases, the results are ultimately returned to the client that was the source of the request (423).

Continuing in more detail, in a preferred embodiment, redirection must be enabled both for DBS 203 and the user who is making the query. The user may also turn redirection on and off. One example of a user who is not permitted to do redirection is the SYSTEM user which manages DBS 203. Redirection is done even when a table is present in DBS 203 when the table contains information whose meaning is database-system specific, for example, when a table is indexed by system-provided, non-unique row identifiers. Cursor modification in a preferred environment is required when the cursor specifies a SELECT operation. The modification involves obtaining column information about the objects referred to in the cursor from DBS 229 and modifying the cursor so that it contains that column information. The column information is retrieved via link 231.

In a presently-preferred embodiment, a cursor is redirected whenever an entire object that the cursor refers to is not present in DBS 203. For example, DBS 203 may contain a materialized view that is a portion of a table in DBS 229. If the cursor refers to the table in DBS 229, the cursor will be redirected, even though the data actually selected by the cursor is in the materialized view. In future embodiments, semantic analyzer 305 may determine from data dictionary 219 what the relationship is between the materialized view and the table in DBS 229, then determine whether the data selected by the query is in the materialized view, and in that case, rewrite the query so that the reference to the table in DBS 229 is replaced by a reference to the materialized view. The cursor made from the rewritten query will of course not be redirected.

Figure 5:
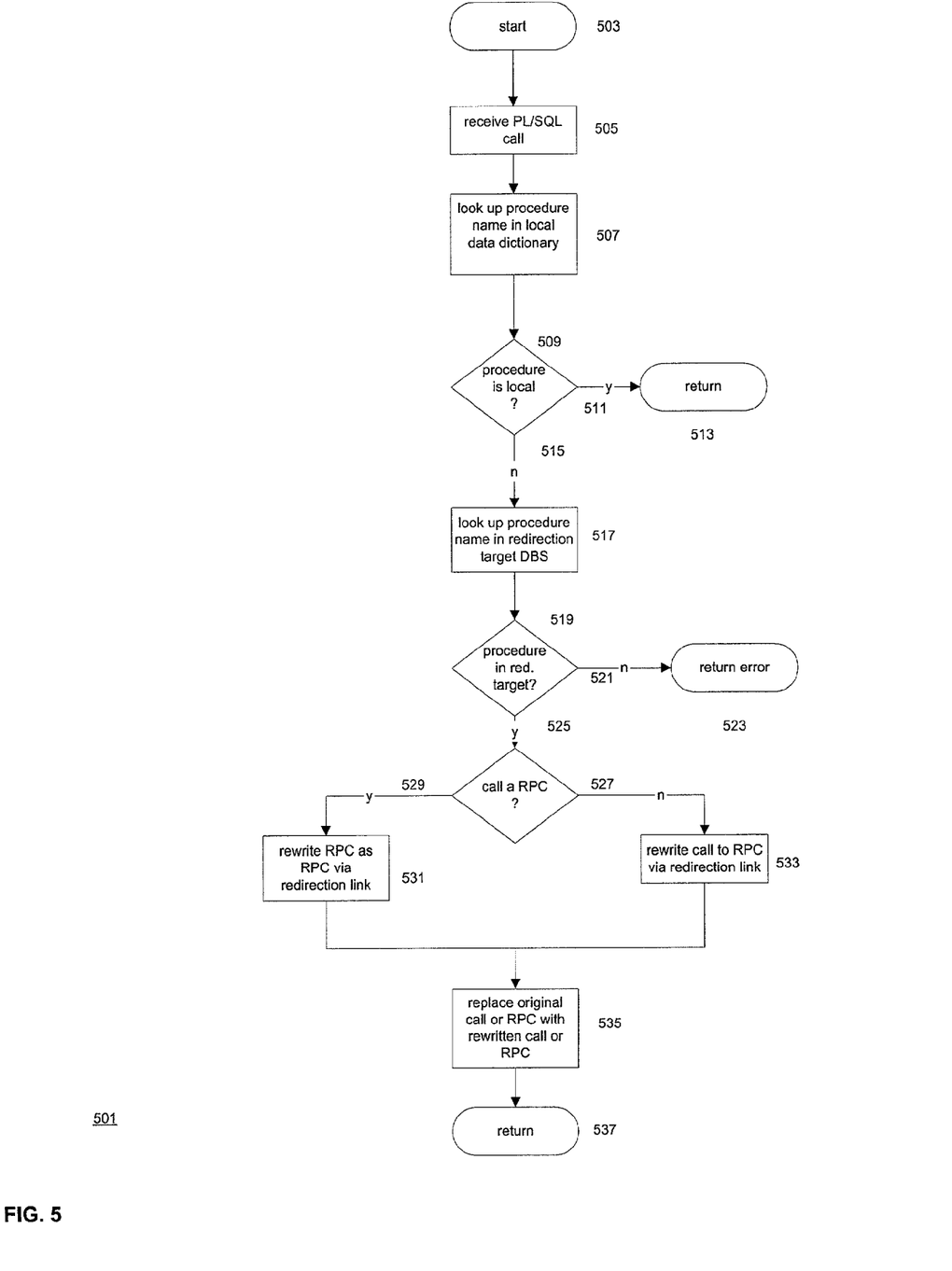
FIG. 5 is a detailed flowchart of stored procedure call redirection.

Redirection of PL/SQL Calls to Stored Procedures: FIG. 5

In a preferred embodiment, redirection of a PL/SQL call to stored procedures is done when the PL/SQL statement containing the call is parsed. When semantic analyzer 305 analyzes a call, it looks for the name of the procedure being called in data dictionary 219. If the name is not there, a lookup error 323 results and semantic analyzer 305 uses PL/SQL redirector 317 to rewrite the call as a remote procedure call via redirection link 231 to the procedure with the same name in redirection target DBS 229. In other embodiments, redirection can be done when the PL/SQL is executed: if an attempt to execute a stored procedure fails because the procedure is not in redirecting DBS 203, the call can be made into a remote procedure call and forwarded via miss redirection link 231 to redirection target DBS 229.

In a preferred embodiment, there are three ways in which a PLI statement containing a call may be received in redirecting DBS 203:

- in a stored procedure from redirection target DBS 229 which has been copied to DBS 203;
- in an "anonymous block" of PL/SQL code which query engine 205 has received in an SQL request from a client; and
- in a remote procedure call which query engine 205 has received in an SQL request from a client.

In the case of PL/SQL procedures stored in redirection DBS 203, the rewriting takes place when the stored PL/SQL program is recompiled after it has been copied from redirection target DBS 229 to redirecting DBS 203. During recompilation, each call that is to a stored procedure that is not in redirecting DBS 203 is rewritten as a remote procedure call to the procedure in redirection target DBS 229.

In the case of the anonymous block and the remote procedure call from the client, the rewriting takes place when the anonymous block or remote procedure call is received from the client. In the case of the anonymous block, the anonymous block is compiled "on the fly" and the rewriting is done during compilation as described above for the stored procedures. The compiled anonymous block is part of the cursor that was made for the SQL request. If the cursor has been redirected because of a miss produced by an SQL statement, PL/SQL procedure calls in the cursor are not rewritten. In the case of the remote procedure call, the remote procedure call in the cursor is simply replaced with a remote procedure call to the procedure in redirection target DBS 229.

FIG. 5 shows redirection in PL/SQL calls in more detail. The steps of flowchart 501 are performed in a preferred embodiment in semantic analyzer 305 and PL/SQL redirector 317. The PL/SQL call may come from a stored procedure that is being recompiled, from an anonymous PL/SQL block, or from a remote procedure call. Redirection begins at 505 when semantic analyzer 305 receives a PL/SQL call for analysis. Semantic analyzer 305 looks up the name of the procedure in redirecting DBS 203's data dictionary 219. If the name is there, the procedure is local and there is no need for redirection, so the semantic analyzer is done processing the call (509, 511, 513). If the name is not there, semantic analyzer 305 calls PL/SQL redirector 317.

Redirector 317 uses redirection link 231 (517) to look up the name in redirection target database 229's data dictionary. In a preferred embodiment, redirector 317 looks first in the stored procedures belonging to the user that is the source of the call being analyzed and then in the PUBLIC stored procedures in redirection target database 229. If the name is found in neither place, redirector 317 returns an error (521, 523) to the semantic analyzer. Otherwise, PL/SQL redirector 317 rewrites the call. If the call is an RPC and the name of the procedure cannot be found in the data dictionary, redirector 317 rewrites the RPC to an RPC via redirection link 507 to target database 229 (531); otherwise, redirector 317 rewrites the call to an RPC to the procedure via redirection link 507 (533). The rewritten call or RPC is returned to semantic analyzer 305, which replaces the original call or RPC with the rewritten call or RPC.

An advantage of the foregoing technique for redirection is that all redirection of PL/SQL procedure calls is done in the context provided by the cursor whose execution results in the procedure calls. A cursor is executed in a session for a user, and the redirected calls specify the user and session. A corresponding session is established in redirection target DBS 229. If the redirected calls were made without the context, the result could be multiple sessions in DBS 229 corresponding to a single session of the application program. In the preferred embodiment, PL/SQL is executed in a session environment which includes session variables that are accessible by all of the PL/SQL blocks being executed by the session; thus, if there is not a 1-to-1 correspondence between sessions redirecting calls in redirecting DBS 203 and sessions executing those calls in redirection target DBS 229, the session variables in redirection target DBS 229 may not have the values belonging to a particular session, and this can affect the behavior of the redirected procedures as well as the values they return to the session in redirecting DBS 203.

It should additionally be pointed out here that the technique used with PL/SQL calls of doing redirection by rewriting the call can be applied to redirection generally. In the presently-preferred embodiment, when semantic analyzer 305 finds any SQL statement that requires redirection, the entire cursor for the SQL statement is redirected. In other embodiments, semantic analyzer 305 could rewrite SQL statements that require redirection. In some cases, such rewriting could eliminate the redirection. One example of this has already been mentioned, namely where there is a materialized view in redirecting DBS 203 that contains a portion of a much larger table in redirection target DBS 229; if the SQL statement specifies a query on the large table that only involves the portion of the table in the materialized view, the SQL statement could be rewritten to execute on the materialized view.

CONCLUSION

The foregoing Detailed Description has shown those skilled in the technologies to which the inventions pertain how to make and use the inventions and also the best mode presently known to the inventors of implementing the inventions. While the techniques are implemented within the particular context provided by Oracle Corporation's implementation of a distributed relational database system with replication of materialized views, they are by no means limited to Oracle Corporation's implementation, nor to caches made by using replicated materialized views, but can be used in any situation where a first database system redirects a request to another database system.

In particular, the redirection techniques are not limited to relational database systems. Further, the redirection can be set up not only at parse time, as in the preferred embodiment, but also at run time. Moreover, the rewriting of individual constructs employed in a preferred embodiment can be used not only with procedure calls, but also with portions of SQL statements, and can be done not only to achieve redirection, but also to prevent redirection in cases where the cache database contains part of a table, but that part contains the set of data specified in the SQL statement. In a preferred embodiment, the redirection employs a redirection link, but any technique for transferring a redirected portion of a request from the first database system to the other database system can be employed.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A method employed in a distributed database system that includes a plurality of database systems for responding to a request received in a particular database system of the plurality of the database systems, the particular database system of the plurality of the database systems including a query engine and a database and the method performed in the particular database system's query engine comprising:
    placing the request in a form required for execution in the particular database system, wherein the request includes a SQL statement;
    determining when the request is parsed whether an execution of the request is preferably done at least in part in another database system of the plurality of the database systems;
    modifying the form when it has been determined that the request is preferably executed at least in part in the other database system, the form required for execution is a cursor and the cursor is marked for redirection; and
    redirecting that part of the execution to the other database system, wherein the modified form is redirected.

2. The method set forth in claim 1 wherein:
    the request includes a specifier referring to an object that is not present in the particular database system; and
    the step of determining whether the execution of the request is preferably done in the other database system determines that the object required for execution of the request is not present in the particular database system.

3. The method set forth in claim 1,
    wherein the act of redirecting can be turned on or off by a user.

4. The method set forth in claim 1, wherein:
    the cursor is redirected whenever an entire object that the cursor refers to is not present in the particular database system.

5. The method set forth in claim 1 wherein:
    the request includes a call to a procedure object; and in the step of modifying the form, the call is rewritten in the form required for execution as a remote procedure call directed to the other database system.

6. A data storage device, characterized in that:
    the data storage device contains code which when executed by a processor performs the method set forth in claim 1.

7. A data storage device, characterized in that:
    the data storage device contains code which when executed by a processor performs the method set forth in claim 2.

8. A data storage device, characterized in that:
    the data storage device contains code which when executed by a processor performs the method set forth in claim 3.

9. A data storage device, characterized in that:
    the data storage device contains code which when executed by a processor performs the method set forth in claim 4.

10. A data storage device, characterized in that:
the data storage device contains code which when executed by a processor performs the method set forth in claim 5.

11. Apparatus that redirects at least a part of a request received in a particular database system belonging to a distributed database system to another database system in the distributed database system, the particular database system belonging to the distributed database system including a query engine and a database and the apparatus comprising:
- a request analyzer in the particular database system's query engine that determines that the request, comprising a SQL statement, is preferably executed at least in part in the other database system, wherein the request analyzer places the request in a form required for execution in the particular database system, causes the form to be modified when the request is preferably executed at least in part in the other database system, and includes the SQL statement in a cursor that the request analyzer causes to be marked for redirection; and
- a redirector in the particular database system's query engine that redirects execution of at least the part of the request to the other database system, wherein the redirector redirects the modified form and the marked cursor.

12. The apparatus set forth in claim 11, wherein a user can turn
the redirector on or off.

13. The apparatus set forth in claim 11, wherein:
the cursor is redirected whenever an entire object that the cursor refers to is not present in the particular database system.

14. The apparatus set forth in claim 11, wherein:
the request includes a call to a procedure object; and
the redirector causes the call to be rewritten in a form required for execution as a remote procedure call directed to the other database system.

15. The apparatus set forth in claim 11 wherein:
the request includes a specifier referring to an object that is not present in the particular database system and
the request analyzer determines that an object required for execution of the request is not present in the particular database system.

16. A data storage device, characterized in that:
the data storage device contains code which when executed implements an apparatus as set forth in claim 11.

17. A data storage device, characterized in that:
the data storage device contains code which when executed implements an apparatus as set forth in claim 12.

18. A data storage device, characterized in that:
the data storage device contains code which when executed implements an apparatus as set forth in claim 13.

19. A data storage device, characterized in that:
the data storage device contains code which when executed implements an apparatus as set forth in claim 14.

20. A data storage device, characterized in that:
the data storage device contains code which when executed implements an apparatus as set forth in claim 15.

* * * * *

UNITED STATES PATENT AND TRADEMARK OFFICE
CERTIFICATE OF CORRECTION

| | | |
|---|---|---|
| PATENT NO. | : 7,945,551 B1 | |
| APPLICATION NO. | : 09/881501 | |
| DATED | : May 17, 2011 | |
| INVENTOR(S) | : Alpern et al. | |

It is certified that error appears in the above-identified patent and that said Letters Patent is hereby corrected as shown below:

On Title page, in column 2, under "Other Publications", line 6, delete "Proceedins" and insert -- Proceedings --, therefor.

In column 3, line 22, delete "81.5/" and insert -- 815/ --, therefor.

Signed and Sealed this
Eleventh Day of October, 2011

David J. Kappos
*Director of the United States Patent and Trademark Office*